United States Patent [19]

Bleckmann

[11] 4,008,845
[45] Feb. 22, 1977

[54] METHOD OF POSITIVE AND NON-POSITIVE COLD-JOINING

[76] Inventor: Richard Bleckmann, Imbergstrasse 24, Salzburg, Austria

[22] Filed: July 11, 1974

[21] Appl. No.: 487,633

[30] Foreign Application Priority Data

July 16, 1973 Germany .......................... 2336149

[52] U.S. Cl. ............................... 228/136; 29/505; 29/521
[51] Int. Cl.² ........................................ B21D 39/03
[58] Field of Search .................. 228/136, 138, 139; 29/505, 521, 526, 573; 403/405, 406; 52/758 D; 156/92, 298; 428/223

[56] References Cited

UNITED STATES PATENTS

| | | | |
|---|---|---|---|
| 1,960,042 | 5/1934 | Andrus | 228/136 X |
| 2,490,549 | 12/1949 | Schultz | 228/136 |
| 2,762,116 | 9/1956 | Rudner | 228/136 |
| 2,849,765 | 9/1958 | De Sena | 403/406 |
| 3,279,972 | 10/1968 | Thassy | 428/223 |
| 3,376,060 | 4/1968 | Tomioka | 403/300 |
| 3,392,439 | 7/1968 | Sonnenschein | 29/573 |
| 3,494,803 | 2/1970 | Avis | 29/573 X |
| 3,700,514 | 10/1972 | Zito | 156/298 X |
| 3,761,007 | 9/1973 | Richter | 228/2.5 |
| 3,828,515 | 8/1974 | Galgoczy et al. | 29/526 X |

Primary Examiner—Al Lawrence Smith
Assistant Examiner—K. J. Ramsey
Attorney, Agent, or Firm—Fleit & Jacobson

[57] ABSTRACT

A method of joining metal sheets together or to shaped bodies, e.g., electric tubular heating elements, wherein use is made of an insert in the form of wire coils, profiled strips, wires or balls which are pressed into the material of the parts which are to be joined together.

2 Claims, 46 Drawing Figures

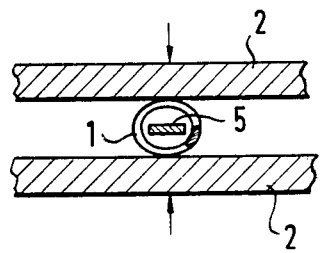
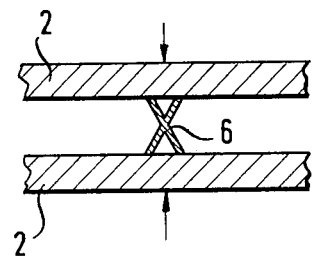
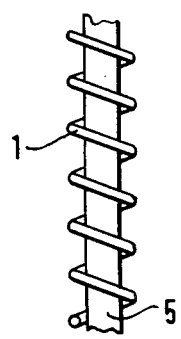
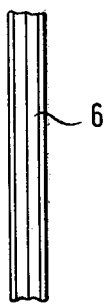
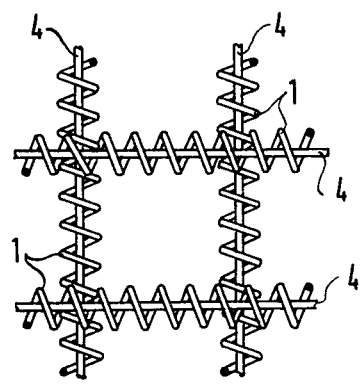
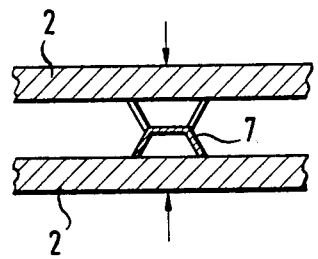
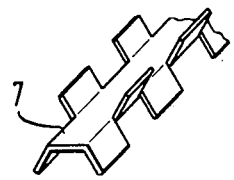

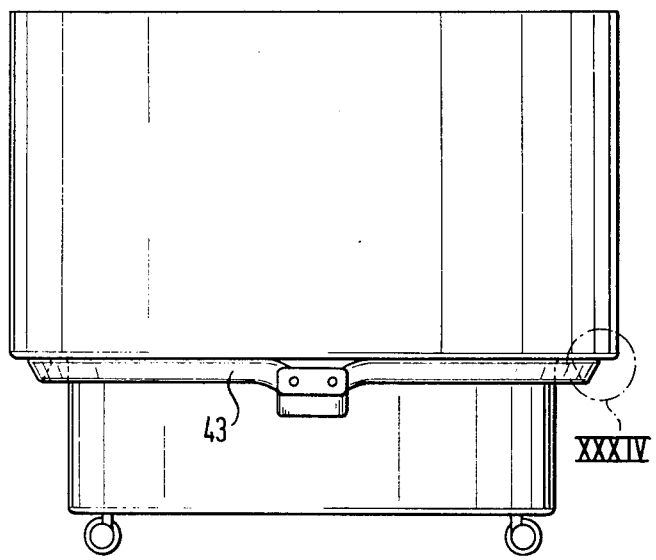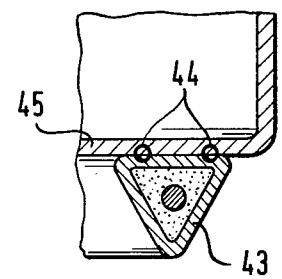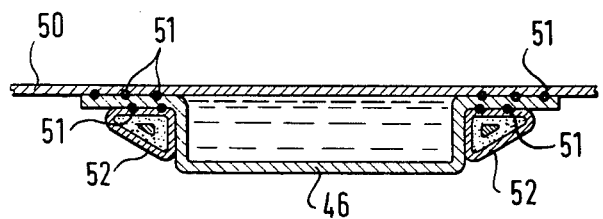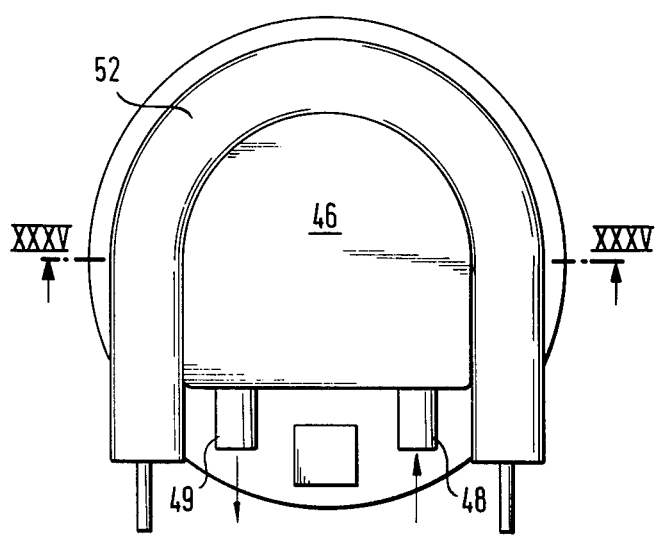

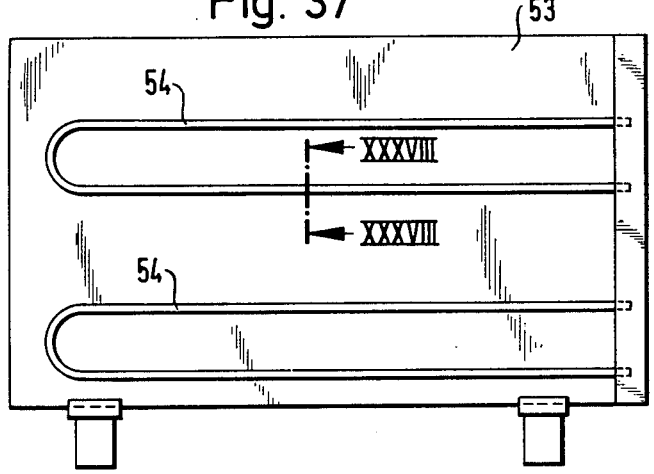
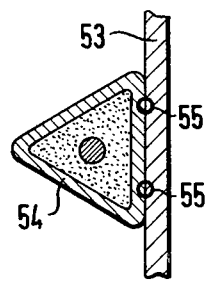
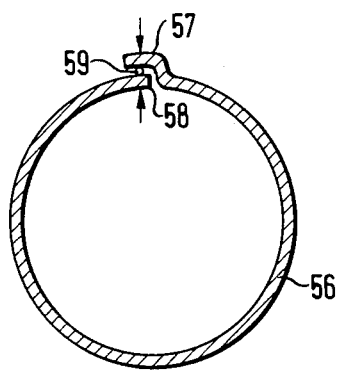
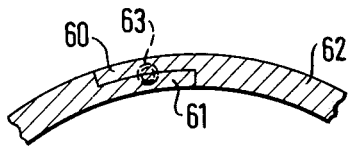
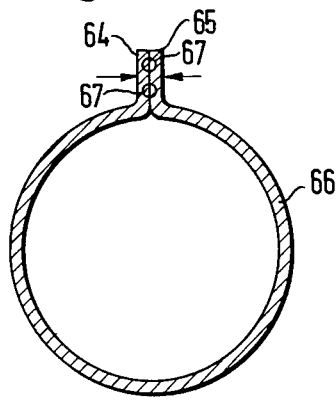
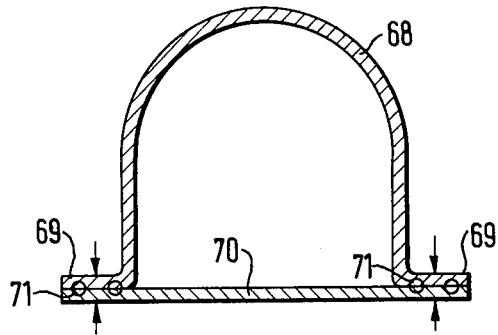

METHOD OF POSITIVE AND NON-POSITIVE COLD-JOINING

The invention relates to a method for the positive and non-positive cold-joining of parts.

It is known to press parts of metal or plastics together by providing recesses or protuberances like the tongue and groove principle and pressing the protuberances into the recesses.

In addition, it is also known from German Patent Specification No. 455,259 for example to furnish the plates being joined together with thread-shaped or conical bore holes, a cylindrical pin being inserted into the respectively coinciding holes.

These methods are disadvantageous to the effect that the surfaces being connected have to be shaped or machined in a certain manner. This leads to considerable expense, especially for mass production, meaning that other methods such as soldering are to be preferred.

German document laid open for inspection No. 2,264,142, in the introduction to which the disadvantages and difficulties of the known methods are discussed in detail, presents a good survey of the present state of the art in the field of composite metals. For the purpose of solving the problems this publication suggests that the surface of an iron plate be furnished with a multiplicity of indentations of suitable width and depth. Aluminium material is then sprayed into these indentations. The latter are produced mechanically, e.g., by means of a tilted cutting tool; this is a very expensive process.

German Patent Specification No. 519,945 puts forward a method for the mechanical joining of two metal sheets; they lie on each other and have different degrees of hardness. The harder of the two has indentations into which some of the softer sheet flows when the metal sheets are pressed together. This patent specification suggests that the indentations be tooth-shaped. However, this means that the harder sheet has to be again treated in a certain way.

U.S. Pat. No. 3,485,518 has made metal joining strips known by means of which wood boards can be joined together flush (column 4, line 34). The joining strips have nail-shaped teeth with which they penetrate the surface of the wood. This is a type of nailing with nail strips.

All the methods described so far also have the disadvantage that the parts to be joined together must have a certain minimum thickness — on the one hand so that the necessary indentations can be worked into the surface, or on the other hand so that the nail strips or joining pins for example can penetrate far enough. Consequently the known method cannot be employed to join thin sheets of metal for example.

A method for the cold welding of two pieces of metal has been made known by Swiss Patent Specification No. 383,730. By the "cold welding" of two pieces of metal we mean methods which are carried out at very great pressure and used as a rule to join different sorts of metal, e.g. aluminium and copper and alloys of these metals. The roughening and thorough degreasing of the surfaces which are to be joined together are essential for cold welding. The method described in this patent specification enables the "scratching" or "brushing" of the surfaces for joining to be dispensed with. To this end, a third piece is placed between the two pieces which are to be welded together; during the pressing process it exerts a roughening, scrubbing or tearing action on the surfaces of the pieces being joining together so that cold welding takes place at the scratched, scrubbed or torn place.

The cold welding processes also include the so-called "explosive plating methods". In these processes two metal plates are held apart, e.g. by 0.4 mm, by means of spacers. An explosive is applied to the upper plate and ignited. The upper plate is thrown against the lower one by the force of the explosion, the metals thereby being joined. These methods are expensive because bunker-like buildings are required for them. The necessary amounts of explosives are considerable.

This invention utilises an effect which is unknown so far. The surfaces of the parts being joined do not need to join themselves together. In this respect it is a cold welding process. Pre-treatment of the surfaces is accordingly not necessary. The effect consists in the fact that an insert of appropriate cross-sectional shape is placed between the parts which are to be joined together, and the material of the parts for joining flows around said insert, a corresponding anchorage being achieved behind the largest cross section of the insert or behind a tilted part of the insert. If the insert is not joined to one of the two surfaces, both surfaces will have to have an anchorage possibility. This condition is satisfied for example by a wire coil or a profiled insert of given shape.

Accordingly, the object of the invention is to propose a method for the positive and non-positive cold-joining of parts having smooth surfaces, which can be employed universally, that is to say for fairly thin sheets of metal also, and in which the surfaces do not need any pre-treatment whatsoever such as machining or degreasing and with which a good joint is achieved by relatively low working pressures. The joint is also designed not to suffer from the action of subsequent heat.

The method according to the invention consists in the fact that between the parts there is at least one insert which is made of a harder material compared with the material of at least one of the parts, and both parts are moved towards each other by the application of a working pressure, the insert penetrating into the material of at least one of the parts and being enclosed by the material so that the insert is anchored in the material.

According to a first preferred embodiment the insert is attached to one of the parts. The insert here may be formed by wires, balls or profiled strips which are fastened by welding, spot welding or soldering to one of the parts consisting of metal.

According to a second preferred embodiment the insert is placed loosely between the two parts or fastened provisionally to one of the parts so that it is fixed in position, the insert being of such a shape that it rests on at least one of the surfaces with a number of contact points being at a distance from one another or in a line-shaped arrangement, and that two different phases are produced during the pressing movement, the first being the penetration of the contact points in the direction of the surface normals, and the second one, which is a product of the penetration step, being a relative movement which may be characterised as "flowing", obliquely or parallel to the contact surface so that the insert is anchored behind the contact surfaces of the parts being joined.

According to a preferred embodiment of the method the insert used takes the form of a wire coil, the pitch of which is matched to the material of the surfaces being joined and to the material of the coil.

It is also preferable for one or more wires or bands to be situated in the wire coil.

The insert may also be made of rolled steel sections, stampings and similar things.

As mentioned above, the parts for joining may be shaped like plates or sheets. However, the method according to the invention is also very suitable for fastening mouldings to a plate, e.g., for attaching an electric tubular heating element to a container wall or the bottom of a cooking utensil. The insert can be attached to one of the parts which are to be joined together, for example by spot welding. The other part, the material of which is softer than that of the insert, is then so pressed on that the insert accordingly penetrates the material of the part pressed on. In this embodiment the insert may then consist of a fairly large number of balls for example.

Further features of the invention are described below with reference to the attached drawings.

FIG. 8 shows an embodiment similar to FIG. 1, use being made of an insert which consists of a coil wound around a band.

FIG. 9 is a top view of the insert used in the embodiment according to FIG. 8.

FIG. 10 shows an embodiment similar to FIG. 1, use being made of a profiled rod for the insert.

FIG. 11 is a top view of the insert used in accordance with FIG. 10.

FIG. 12 is a top view of an insert consisting of intersecting rods, each of which carries a wire coil.

FIG. 13 shows an embodiment similar to FIG. 1, use being made of a stamped profile for the insert.

FIG. 14 is a diagrammatic view of the insert used in accordance with FIG. 13.

FIG. 33 is a part view of a so-called fritteuse or frier.

FIG. 34 shows a section from FIG. 33 on a larger scale.

FIG. 35 shows a section along line XXXV—XXXV from FIG. 36 showing the hot-plate of a coffee-percolator.

FIG. 36 shows a bottom view of the hot-plate according to FIG. 35.

FIG. 37 is a top view of a radiator for room heating purposes.

FIG. 38 is a magnified sectional view along line XXXVIII—XXXVIII from FIG. 37.

FIG. 39 is a cross section showing how pipes are made for metal sheets.

FIG. 40 is a partial view of a modified embodiment according to FIG. 39.

FIG. 41 shows a modified embodiment similar to FIG. 39.

FIG. 42 is a cross section showing how a pipe, e.g. for cooling liquids, is manufactured.

Figure 1:
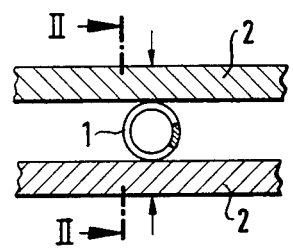
FIG. 1 shows the cross section of two metal sheets which are to be joined together, a coil being arranged between them.
Figure 2:
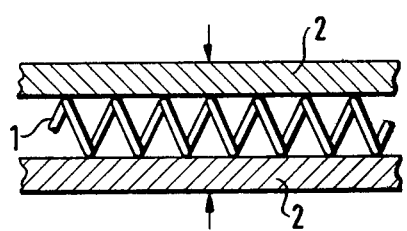
FIG. 2 is a section along line II—II from FIG. 1.
Figure 3:
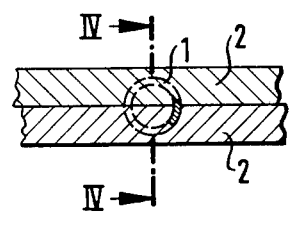
FIG. 3 shows the embodiment according to FIGS. 1 and 2 after the sheets are pressed together.
Figure 4:
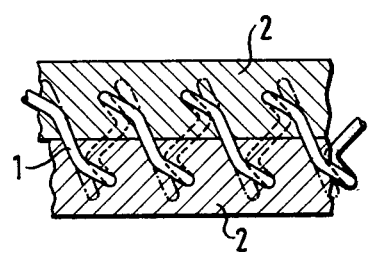
FIG. 4 is a sectional view along line IV—IV from FIG. 3 on a larger scale.

Metal sheets 2, 2 of aluminium for example are to be joined together with reference to FIGS. 1 to 3. A coil 1 acting as an insert is placed between sheets 2, 2. The material of coil 1, the thickness of the wire and the pitch have to be matched appropriately to the material of sheets 2, 2. This can be readily determined by tests. The coil must not be pressed flat between sheets 2, 2. If the choice is appropriate, a novel effect can be achieved which consists in the fact that the peak of each coil winding can be pressed into the material of sheets 2, 2 in an obliquely extending impression duct, the angle of the impression duct to the surface normal of sheets 2, 2 at the beginning being roughly corresponding to the pitch angle of the coil. If sheets 2, 2 are then pressed further towards each other, the size of this angle will increase, roughly one half of the wire coil being enclosed by the material of one of the metal sheets and the other half by the material of the other sheet, as shown in FIG. 4. This produces an anchorage which prevents the compressed metal sheets shown in FIGS. 3 and 4 from being detached from each other, not even when relatively great force is applied. If the pitch of the coil is made too large, the coil windings will penetrate the sheet material at a more or less perpendicular angle, thus producing a poorer joint. The following data will serve as a practical example:

| | |
|---|---|
| material of sheets 1 and 2: | aluminum |
| sheet thickness: | 1.5 mm |
| material of the coil: | copper wire resistant to drawing |
| wire thickness of the coil: | 0.6 mm dia. |
| pitch of the coil: | 2 mm |

For working with fairly large metal sheets use is made of several wire coils arranged at a distance from each other, the number and spacing of the wire coils being solely dependent on the strength demanded of the joint between sheets 2, 2. Use may be made of single coil pieces or continuous coils. It is advisable to use a press to make smaller pieces. Larger composite metal sheets can be made by passing the metal sheets through engaging rolls, continuous coils being allowed to run between the sheets at gaps of 5 cm for example. At the end of the pressing work, sheets 2, 2 are fully in contact with each other, as shown in FIG. 3. It is not possible to identify from outside how they are joined together.

Figure 5:
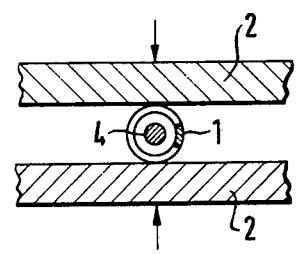
FIGS. 5 to 7 show a modified embodiment similar to FIGS. 1 to 3, a wire being arranged in the coil.
Figure 6:
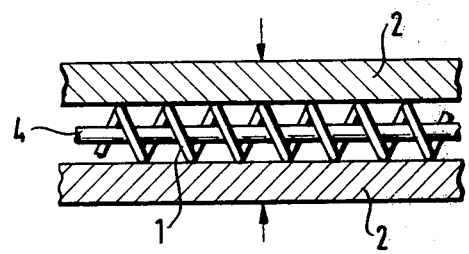
Figure 7:
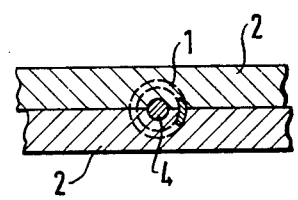
Figure 15:
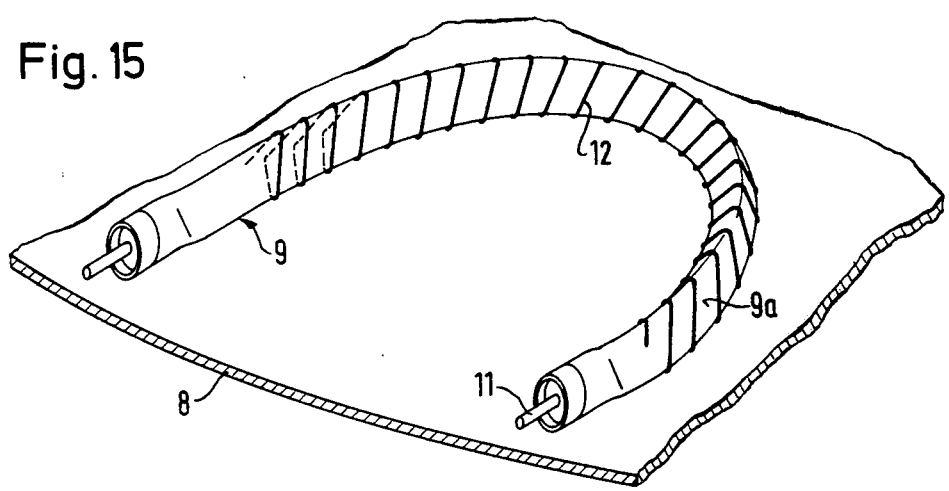
FIG. 15 is a diagrammatic view of a tubular heating element around which a wire is wound and which is connected with said wire to a sheet.

An inner wire 4 is arranged in coil 1 in keeping with the embodiment according to FIGS. 5 to 7. The coil which is in itself elastic thus gets a better hold so that it is easier to handle. Here, inner wire 4 may be pushed into the finished coil 1. However, coil 1 may also be wound around inner wire 4. The latter can be bent to certain shapes so that the joint can accordingly follow a given constructive situation. This enables bodies to be joined together which have a corresponding surface design, i.e., which are to be joined together for example along protuberances in a circle or other awkward shapes.

FIGS. 8 and 9 explain the use of a band 5 around which coil 1 is wound. The "fastening seam" can thus have any given width.

FIGS. 10 and 11 show that a profiled bar 6 is also suitable as an insert. The cross section of profiled bar 6 is roughly x-shaped, there being four bridges standing out from the centre of the profile. At the beginning of the pressing operation two bridges penetrate each of sheets 2 and the bridges start to bend around the profile centre as the pressure increases, the above described anchoring effect then being produced.

According to the embodiment according to FIG. 12 the insert takes the form of a grid. This is formed in that a fairly large number of the inserts used in accordance with the embodiment according to FIGS. 5 to 7 are placed on top of each other in the form of a cross. Inner wires 4 are then joined appropriately at the points of intersection by spot welding for example. It is easy to understand that an insert of this kind is very simple to handle.

FIGS. 13 and 14 serve to explain the use of a correspondingly shaped stamping 7. Stamping 7 is made of a band, incisions being made at regular intervals on both sides extending by about one third across the width of the band and the resulting tongues being bent up and down alternately.

FIGS. 15 and 17 to 19 serve to explain how a tubular heating element is fastened to a sheet or plate 8. Plate 8 may for examle be the bottom of a frying pan, a container wall or a carrying plate which is designed to radiate heat. The customary methods of fastening tubular heating elements to such plates were expensive. As a rule, welding on by means of spot welding is out of the question for technical reasons, and the soldering-on of the tubular heating element is only possible with certain materials, e.g., copper. However, other materials such as aluminium with its high degree of thermal conductivity or chrome-nickel steel which is resistant to corrosion are frequently desired. In such cases there is a series of technical difficulties and besides, the material loses its strength. The method according to the invention now provides a new way of joining a tubular heating element to a plate 8 of any given material, which joint is firm and conducts heat well. Before being pressed on, the tubular heating element consists of a preferably oval jacket tube 9 containing an insulating material 10, e.g., magnesium oxide. A heating coil 11 is embedded in insulating material 10. Around jacket tube 9 is wound a wire 12 consisting of a material which is harder than the material of plate 8. When the tubular heating element is pressed on in a die not shown here, the oval cross section of jacket tube 9 is pressed into a triangular cross-sectional shape 9a. This produces a braod contact surface 9b with the result that on the one hand the transmission of heat to plate 8 is good and on the other hand a broad anchoring surface is obtained. In the pressing operation those pieces of wire 12 which are in contact with plate 8 penetrate the material of the plate and are enclosed by it. At the same time, the insulating material layer 10 is compressed to its optimum density, which means that the otherwise customary pressing of the tubular heating element between rolls for example can be dispensed with.

Figure 16:
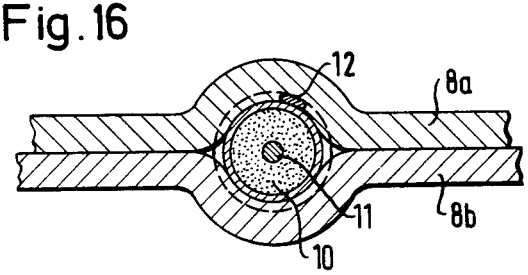
FIG. 16 is a cross-sectional view of a tubular heating element around which a wire is wound and which carries two metal sheets to magnify heat radiation.
Figure 17:
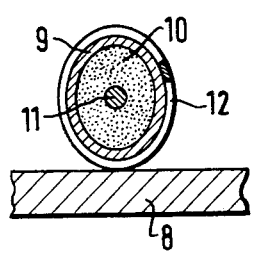
FIG. 17 is a cross-sectional view of a tubular heating element before the pressing-on step.
Figure 18:
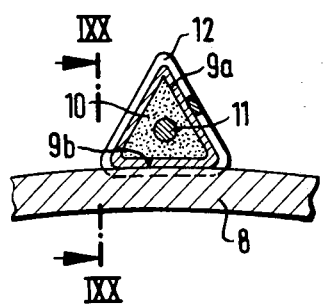
FIG. 18 is a cross-sectional view of the tubular heating element according to FIG. 17 after the pressing-in step.
Figure 19:
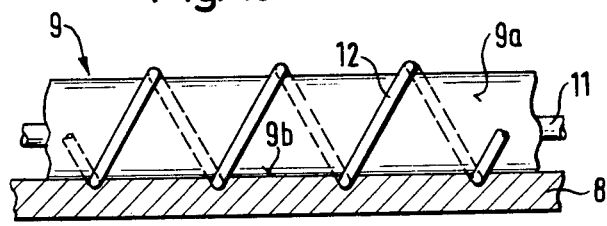
FIG. 19 is a sectional view along line XIX—XIX from FIG. 18.

FIG. 16 shows an embodiment in which a tubular heating element is furnished with two sheet metal strips 8a and 8b to improve the heat radiation. When sheet metal strips 8a and 8b are being pressed onto the tubular heating element, wire 12 which is wound around the tubular heating element is pressed into the material of sheet metal strips 8a and 8b which flows around said wire so that the sheet metal strips and tubular heating element are joined together firmly.

Figure 20:
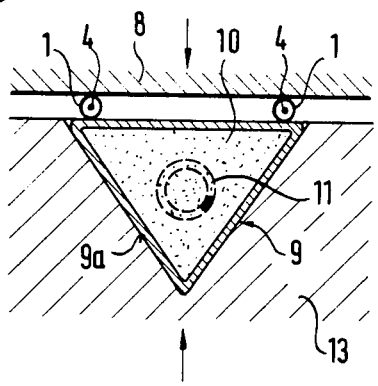
FIG. 20 is a section through a mould for the purpose of explaining the pressing of a tubular heating element onto a sheet.

FIG. 20 shows the shape of a stamping die 13; and which serves to press a tubular heating element onto a plate 8. However, the embodiment shown here has been modified compared with the one mentioned before to the effect that two wire coils 1, each having a core 4 in keeping with the embodiment shown in FIGS. 5 to 7, are used instead of wire 12.

Figure 21:
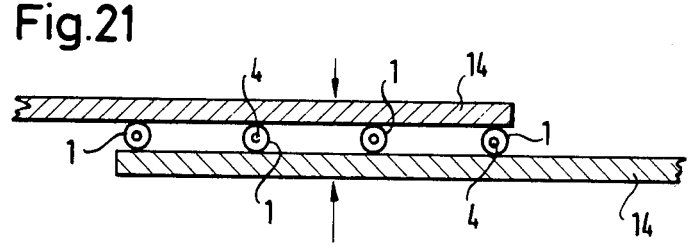
FIG. 21 shows a part section which illustrates the joining of two sheet metal panels for the manufacture of relatively large units.

FIG. 21 serves to show how two sheet metal panels or sheet metal strips 14 are joined together, several coils 1 furnished with inner wires 4 being arranged at a distance from each other between sheet metal panels 14. This method replaces the customary, yet much more expensive riveting process and affords the additional advantage that there are no rivet holes or rivet heads. After being pressed, panels 14 stick together just as well as if they have been riveted.

Figure 22:
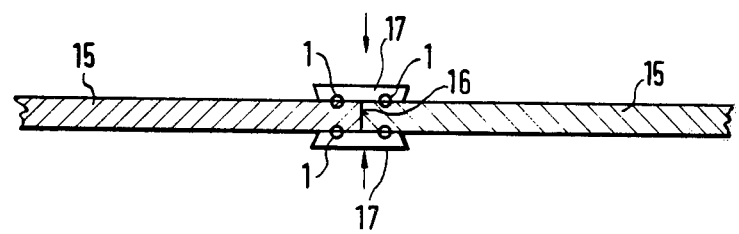
FIG. 22 is a cross section of an arrangement in which two sheet metal panels are joined together at their ends.

FIG. 22 serves to show how sheet metal panels 15 are joined together at their face edges 16. To this end use is made of joining strips 17 which bridge the face edges 16, at least four wire coils 1 having been placed between joining strips 17 and sheet metal panels 15.

The method according to the invention affords special advantages in heat-conducting connections for both heating and cooling purposes. When for example tanks, hot-water heaters, frying pans, friers, coffee-percolators, washing machines or dishwashers have to be heated from outside, there are considerable losses on account of the poor passage of heat between the heating element and container wall. In the case of thermostat-controlled frying pans, friers, coffee-percolators and similar appliances one normally manages by employing an aluminium die casting in which an electric tubular heating element is cast.

Another possibility consists in furnishing the die casting with holding grooves into which an electric tubular heating element is pressed subsequently. Quite frequently, electric tubular heating elements are also soldered onto the outer wall of the container. All these methods are expensive and produce quite a number of rejects.

In the method according to the invention the parts to be connected are pressed together with the insert named above and are thus joined together in heat-conducting fashion. The heat distribution can be made very regular by shaping this insert accordingly.

Figure 23:
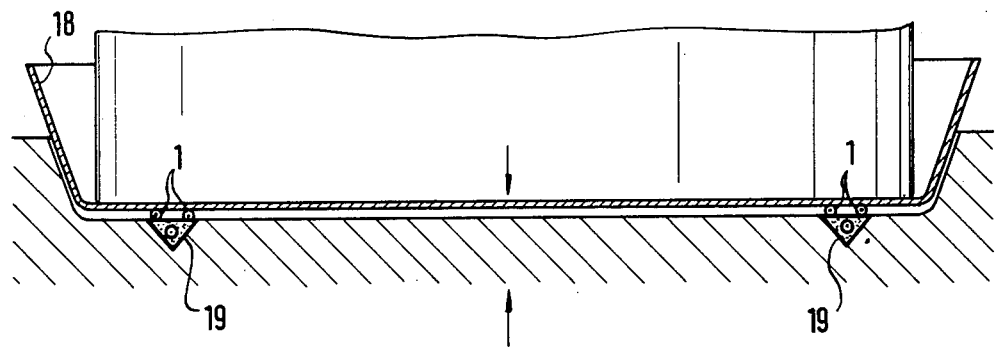
FIG. 23 is a cross section of a mould for pressing a tubular heating element onto a frying-pan.

FIG. 23 now shows the application of the method according to the invention to the manufacture of an electrically heated frying pan 18 made of aluminium. The tubular heating element 19 which is to be attached to the bottom of the frying pan has an aluminium jacket which is pressed into a triangular profile. This is done with stamping die 13 shown in FIG. 20.

The method according to the invention is particularly suitable for joining together two parts made of the same material having the same degree of strength. In many cases, however, it is also desirable to join parts together which have different degrees of strength. Cooking utensils for example are largely made in that the pot is made of thin stainless steel whereas a thick plate of aluminium or copper is case integrally with or soldered onto the bottom.

Figure 24:
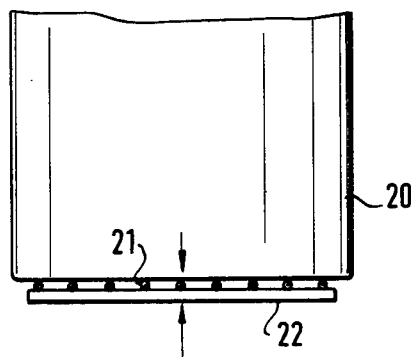
FIG. 24 is a diagrammatic view showing how a pan with a strengthened bottom is made.

A saucepan is made in the following manner in accordance with the invention as represented in FIG. 24:

An insert, e.g. a coil bent in the shape of a spiral or an insert consisting of several pieces, is joined by spot or seam welding to the bottom of a saucepan 20 which is made for example of stainless sheet metal 1 mm thick. Coil 21 consists for example of wire 0.6 mm in diameter and has a pitch of 2 mm. It has an inner wire 1.5 mm in diameter. Coil 21 has the shape of an Archimedes' spiral and is joined by spot or seam welding to the bottom of pan 20 which consists of non-corrosive steel. It is relatively simple to weld the coil on because the tops of the coil act like welding projections. After coil 21 is welded on, an aluminium plate 22 is so pressed on that plate 22 is in very close contact with the bottom of saucepan 20.

Figure 25:
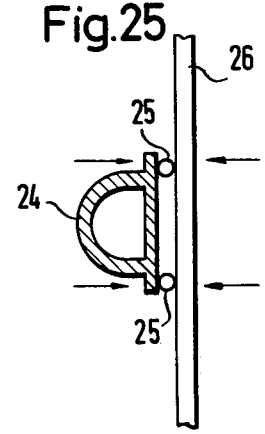
FIG. 25 is a diagrammatic view showing how pipes, e.g. cooling pipes, are fastened to a sheet of aluminium.

In refrigerators the evaporator was formerly designed like round aluminium tubes which were arranged in the refrigerating chamber. A significant step forwards was achieved by the use of plated aluminium sheets with raised ducts which are however expensive. As shown in FIG. 25, evaporators of this kind can now be manufactured in accordance with the invention in that normal cooling pipes 24 are attached to a normal aluminium sheet 26 with inserts 25 between the two. As mentioned before, inserts 25 may consist of wires or wire coils or profiled rods. If insert 25 is a normal round wire and not a wire coil, it is advisable to attach it to cooling pipe 24 beforehand by spot welding.

Figure 26:
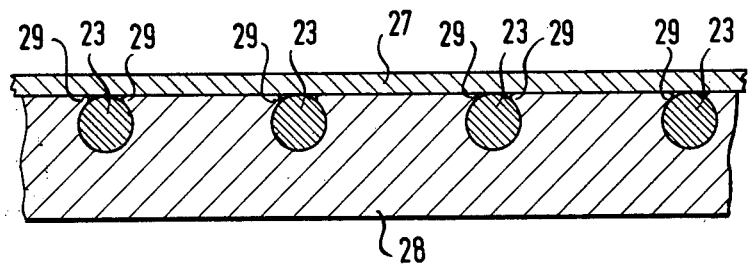
FIG. 26 is a cross section of an embodiment in which balls or wires are used for the insert.

The resulting effect is illustrated in FIG. 26 on a larger scale. When wires 23 which are welded for example onto a plate 27 are pressed into a material 28 softer than that of the wires, said material 28 flows around wires 23 under the working pressure at points 29, thus producing the anchoring effect already described at the beginning.

Balls which are attached by spot welding may also be used instead of wires 23.

Figure 27:
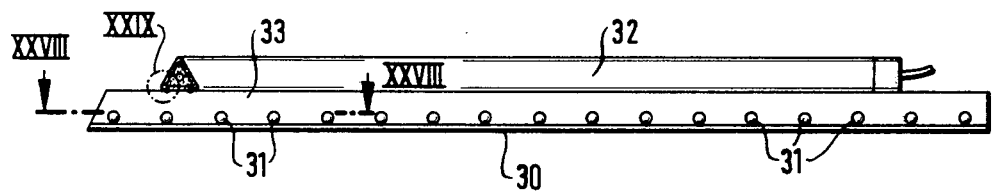
FIG. 27 is a sectional view of the sole of a flat iron to which a tubular heating element is attached.
Figure 28:
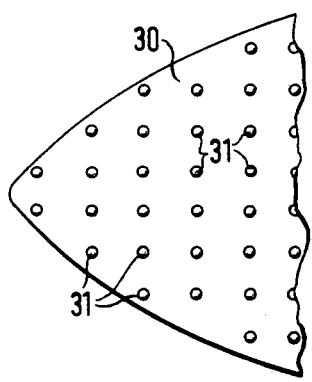
FIG. 28 shows a part section along line XXVIII—XXVIII from FIG. 27.
Figure 29:
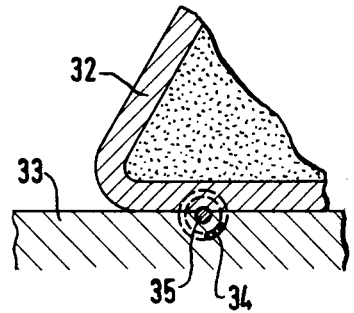
FIG. 29 shows a section from FIG. 27 on a larger scale.

FIGS. 27 to 29 illustrate the manufacture of a flat-iron sole.

A fairly large number of balls 31 are attached by spot welding to a relatively thin metal sheet 30 made of chrome-nickel steel for example. Plate 30 and a tubular heating element 32 are now pressed onto an aluminium plate 33, wire coils 34 with cores 35 being placed between the tubular heating element and aluminium plate, similarly to the embodiment described in FIG. 20.

Figure 30:
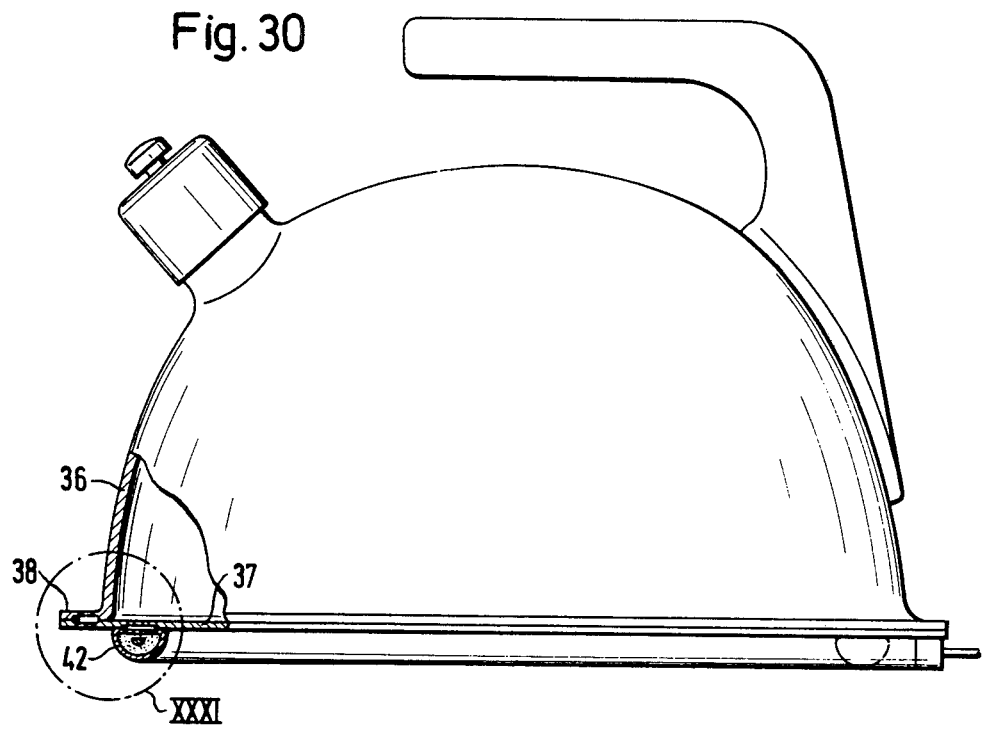
FIG. 30 is a diagrammatic sectional view of a water kettle.
Figure 31:
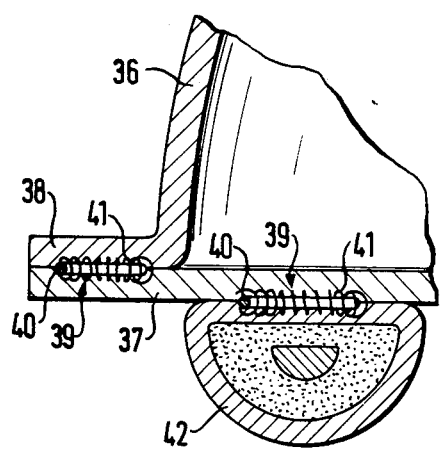
FIG. 31 shows a section from FIG. 30 on a larger scale.
Figure 32:
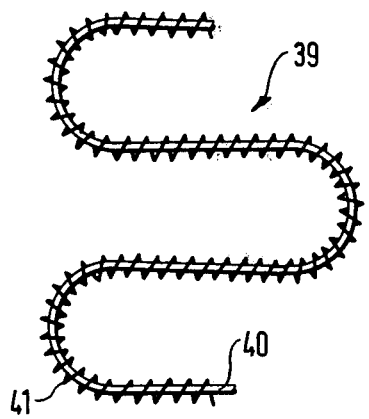
FIG. 32 is a view of the insert used in the embodiment according to FIGS. 30 and 31.

FIGS. 30 to 32 illustrate the manufacture of an electrically heated water kettle.

A bottom 37 is fastened to a kettle top 36 in that an insert 39 is placed between a flange 38 of kettle top 36 and the bottom 37. The insert is anchored in both flange 38 and bottom 37 by means of an appropriate pressing operation. As shown in FIG. 32, insert 39 consists of a wire 40 bent in the shape of a wave on which a coil 41 is arranged.

A tubular heating element 42 is pressed onto bottom 37 together with a similar insert 39.

FIGS. 33 and 34 show a so-called fritteuse or frier which is heated electrically. In keeping with the method described in FIG. 20 a tubular heating element 43 is fastened to the bottom 45 of the frier with wire coils 44 between the two of them.

FIGS. 35 and 36 illustrate the manufacture of the hot-plate for a coffee-percolator. A bowl-shaped bottom part 46 of aluminium has a connection 48 for the water supply delivered from a higher vessel not shown here, and a connection 49 for the water outlet. A lid 50, similarly made of aluminium, is joined to the flange of bottom part 46 with wire coils 51 between the two of them. Further, a tubular heating element 52 is similarly fastened to the underside of the flange with wire coils 51 between the two of them. Lid 50 and tubular heating element 52 can be pressed on in one operation.

FIGS. 37 and 38 illustrate an heating element which is mainly used for room heating purposes. Two hairpin-shaped tubular heating elements 54 are pressed together with wire coils 55 onto a fairly large metal sheet 53 made of material which conducts heat well, particularly aluminium, use being made of the method described in conjunction with FIG. 20. It is obvious that the manufacturing process is extremely simple and reasonable in price. Excellent heat transmission from tubular heating element 54 to plate 53 is achieved. Ideal heating characteristics are obtained thanks to the plate's large surface and the resulting, good transmission of heat to the air in the room, that is to say heat radiation. Since the temperature of tubular heating element 54 is relatively low and the insulating material used in the tubular heating element is compressed to its optimum value when it is pressed on, the heating element will have a very long service life.

FIGS. 39 to 42 show how pipes, ducts and tubes of sheet metal strips can be made in accordance with the invention without welding or other complicated operations being necessary.

As shown in FIG. 39, a sheet metal strip 56 is bent into a circle, an edge strip being flanged off at 57 so that it overlaps the other edge strip 58. A continuous wire coil 59 is placed between edge strips 57 and 58. The edge strips are so pressed onto each other that the wire coil is fully embedded in the material of edge strips 57 and 58. It is clear that the bending of sheet metal strip 56, the insertion of wire coil 59 and the pressing operation can be carried out by an appropriate tool in a continuous mode of working.

A modification of the embodiment according to FIG. 39 can be employed for pipes which have thicker walls, the edge areas 60 and 61 of a sheet metal strip 62 being made thinner by milling or pressing and being joined together with a wire coil 63 between the two of them. This method affords the advantage that the surface of the finished pipe is smooth and you cannot see how the joint has been made.

In accordance with the embodiment shown in FIG. 41 the edge strips 64 and 65 of a sheet metal strip 66 are bent at right angles and joined together by appropriate pressing, wire coils 67 being placed between the two of them. This embodiment has the advantage that edge strips 64 and 65 can be utilised to fasten the pipe or hang it up.

FIG. 42 illustrates the manufacture of a conduit, a U-shaped sheet metal strip 68 with bent flanges 69 being fastened to a plane sheet metal strip 70 by appropriate pressing, wire coils 71 being placed between the flanges and metal strip. Sheet metal strip 70 may of course also be a relatively large plate on which a conduit system for cooling liquids for example may then be arranged in the given manner.

Figure 43:
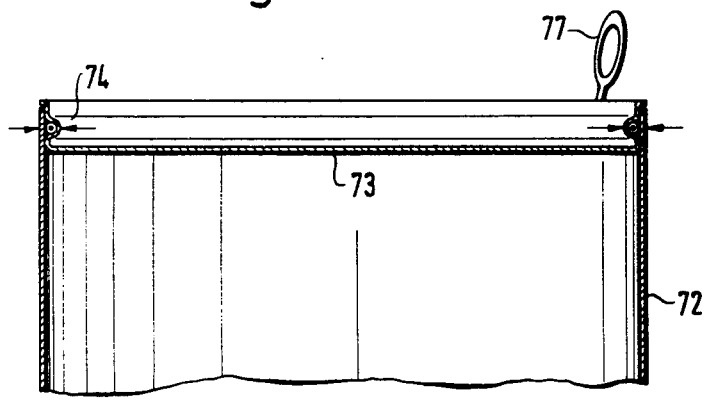
FIG. 43 is a sectional view of the topside of a can.
Figure 44:
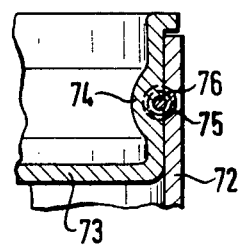
FIG. 44 shows a partial section from FIG. 43 on a larger scale.

FIG. 43 shows that food cans may also be closed with the aid of the invention. A lid 73 which has a groove 74 to hold a wire coil 75 and core 76 is inserted into a can body 72. In this case, core 76 is made a little longer than wire coil 75 and is joined to a tear-off grip 77. Pressing in the direction of the arrows produces a lasting and airtight joint between lid 73 and can body 72. However, this joint can be undone again when wire coil 75 is pulled out.

Figure 45:
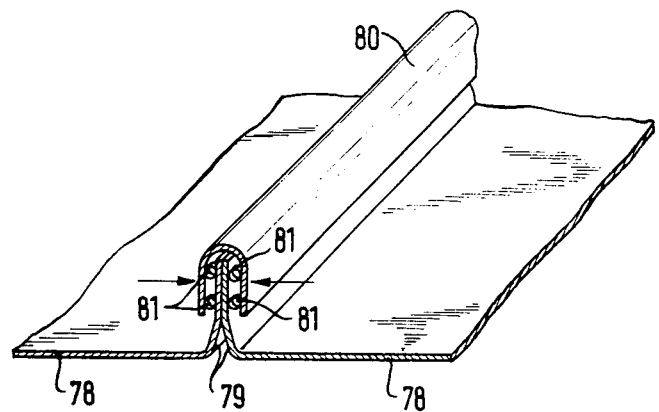
FIG. 45 is a diagrammatic view for the purpose of explaining how a roof seal is made.

FIG. 45 illustrates an embodiment with which relatively large sheet metal covers, e.g. roof covers, can be made from individual sheet metal panels, the appropriate assembly work being done on site. To this end, sheet metal panels 78 are bent back at their end strips 79. A hood-shaped cover 80 is placed over the joint of the edge pieces 79 with wire coils 81 in between. The joint is made by a pneumatic hand tool which progressively presses together the legs of cover 80 in the longitudinal direction of the cover. To make the work easier, wire coils 81 may already be fastened in advance by the maker to cover 80 by means of spot welding for example. In this case, different inserts, e.g. wires or profiled strips, may be used instead of wire coils.

Figure 46:
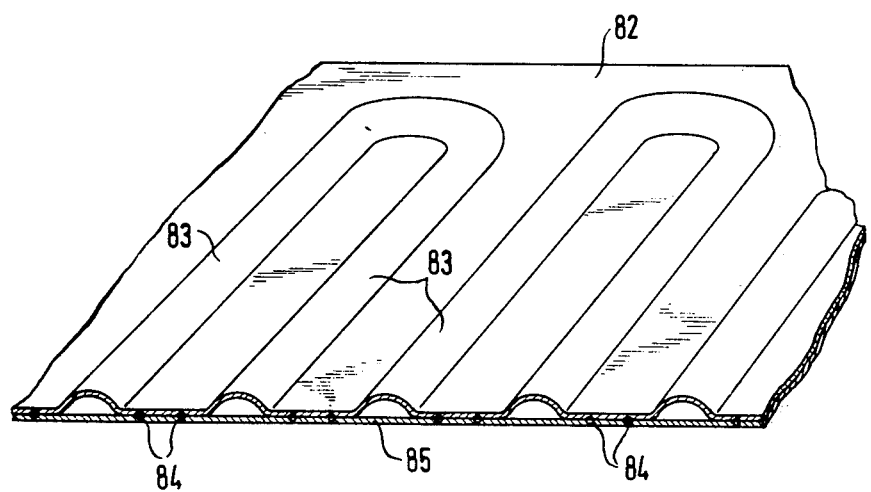
FIG. 46 is a diagrammatic view designed to explain how a pipe system, e.g., for cooling or heating media, is made.

FIG. 46 illustrates the manufacture of a conduit system, e.g. for an evaporator in a refrigerator. Groove-shaped indentations 83 are pressed into a sheet metal plate 82. Plate 82 is then placed on a plane sheet metal plate 85 with wire coils 84 in between. The two sheet metal plates are joined together by pressing the areas between the groove-shaped indentations 83.

What is claimed is:

1. A method of joining a metallic first member to another metallic planar sheet member comprising the steps of providing a metallic first member and a metallic planar sheet member, providing at least one wire coil of metallic material having a hardness greater than the hardness of said sheet member, securing said wire coil to said first member, moving said metallic members together with at least a portion of said wire coil therebetween, compressing said metallic members into overlying, flush engagement to enclose said at least a portion of said wire coil with the material of said sheet member and thereby cold-join said metallic members together in a securely bonded relationship.

2. A method in accordance with claim 1 wherein said first member comprises a tubular heater and wherein said wire coil surrounds said first member.

* * * * *